Feb. 13, 1940.  W. C. BARNES ET AL  2,190,143
MECHANICAL CLAMP
Filed May 14, 1937

Inventors.
Walter C. Barnes
Henry W. Keevil
By Gibson, Mann & Attys.

Patented Feb. 13, 1940

2,190,143

UNITED STATES PATENT OFFICE 2,190,143

MECHANICAL CLAMP

Walter C. Barnes, Lake Bluff, and Henry W. Keevil, Highland Park, Ill.

Application May 14, 1937, Serial No. 142,561

7 Claims. (Cl. 173—273)

The principal object of this invention is to provide a simple, easily manipulated, mechanical clamp for quickly establishing an electrical contact between two electrical conductors such, for example, as a rail head and the terminal of the electric cable which is commonly used to introduce current into the rail when testing for flaws by the electrical drop in potential method.

Other objects and advantages will become apparent as the disclosure proceeds and the description is read in conjunction with the accompanying drawing, in which—

Figure 1:
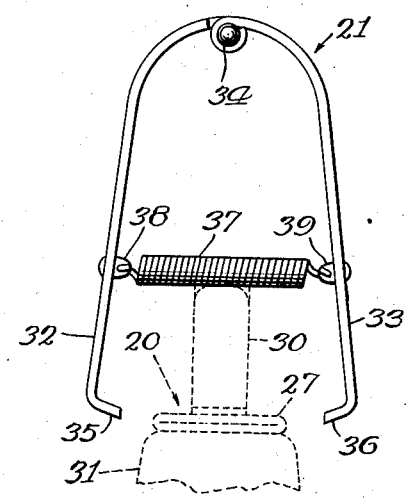
Fig. 1 is an end view of the clamp with the jaw arms shown in the position which they assume when the clamp is not in use.

A preferred embodiment of this invention is selected for the purpose of description only and is not intended to place limitations on the claims beyond those required by the state of the prior art.

This clamp obviously has a great many uses but for the purpose of convenience, it is shown embodied in a form which is particularly useful in the field of rail testing for flaws by the electrical drop in potential method. When testing rails by this method a test car equipped with flaw detection apparatus travels along the rails until a fissure is detected. The equipment is generally sensitive enough only to detect the location of the fissure but in order to determine the exact position and the extent of the flaw, it is necessary to stop the car and to make a hand test with some sort of hand check equipment.

The electrical drop in potential method involves the passing of a direct current through the portion of the rail to be tested and then determining a standard drop in potential between two points a known distance apart moved along the energized portion of the rail. This standard potential difference remains substantially constant as the spaced points are moved along the rail until a flaw is traversed and then a sudden variation in the potential reading is observed.

To pass a current through the rail a pair of spaced conductors are affixed to the top of the rail, one of which may conveniently be secured to and lowered from the car body itself while the other is preferably manually applied to the rail. It is to means for effecting this manual contact that the present invention relates, although of course the principle of the invention is well adapted, in the illustrated or other embodiment, to be used for other electrical contact purposes.

A manually applied conductor 20 is shown applied to the rail 11 and is held in place by means of the mechanical clamp generally indicated at 21. The rail 11 may be considered to be energized, as by means of a direct current generator preferably mounted in a car body, not shown in the drawing, and supplying current through electrical conductor 25.

Figure 2:
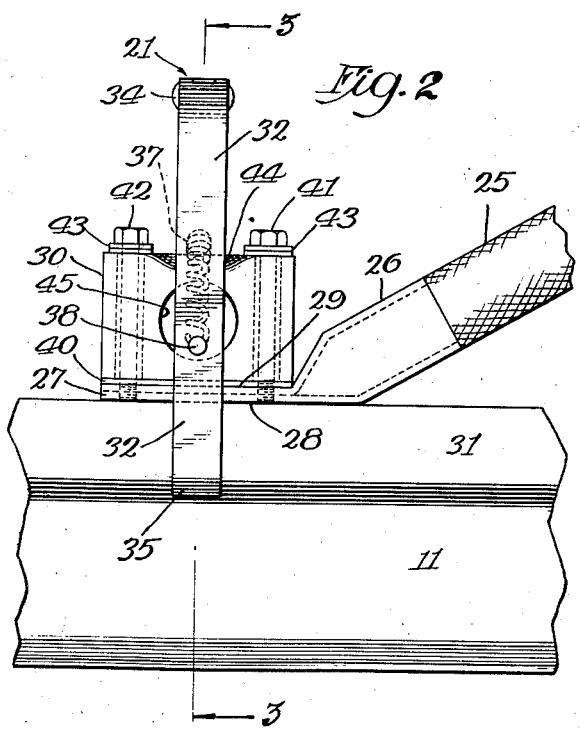
Fig. 2 is a side elevational view of the clamp shown as applied to the rail head.
Figure 3:
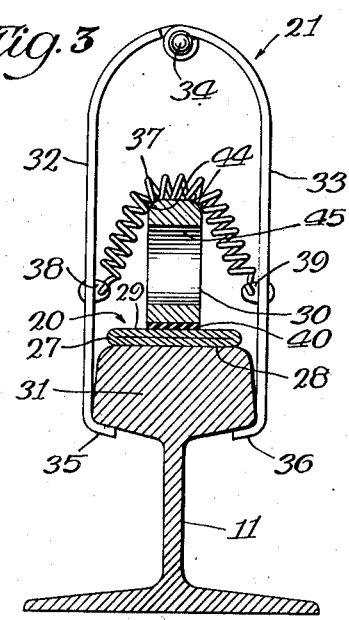
Fig. 3 is a vertical sectional view taken on the line 3—3 of Fig. 2, the clamp, however, being shown in elevation.

The conductor 25 terminates in a copper terminal member 26 which tapers to a flat and substantially rectangular end portion 27 so as to provide an even flat surface 28 adapted to engage the top surface of the rail as shown in Fig. 2, and a second plane surface 29 to provide a seat for the block 30. The mechanical clamp is adapted to straddle the head 31 of the rail 11 as shown in Fig. 3 and comprises a pair of jaw arms 32 and 33 joined at the top and secured by means of a pivot 34. The lower ends of the jaw arms are bent inwardly as shown at 35 and 36 in such manner that they will engage the lower faces of the rail head as shown in Fig. 3. A coil spring 37 extends between the jaw arms 32 and 33 and is secured at opposite ends to lugs 38 and 39 extending inwardly from the jaw arms 32 and 33, respectively, leaving a fairly substantial clearance space between the spring and the pivot 34.

A pad 40 of some suitable insulating material is inserted between the block 30 and the end portion 27 of the copper terminal 26 to prevent current from passing through the block 30. Bolts 41 and 42 are provided for securing the block 30 to the terminal member 26 and insulating washers 43 are inserted between the heads of the bolts and the block 30.

When it is desired to secure the manually applied conductor to the rail, the terminal member 26, carrying with it the block 30, is placed on the top surface of the rail 11 and then the mechanical clamp 21 is brought down with its arms 32 and 33 straddling the terminal member and the rail head 31, until the spring 37 engages the top of the block 30. Pressure is then exerted downwardly to further lower the clamp and to force the inwardly turned ends 35 and 36 towards the lower faces of the head 31, the spring 37 being flexed into the clearance space, as shown in Fig. 3. This flexing of the spring causes the arms 32 and 33 to be urged toward each other so that as the ends 35 and 36 come to the under surface of the rail head 31 they snap in place and firmly hold the terminal 26 against the rail. The top edges of the block 30 are bevelled along the central portion of the block as shown at 44 so as to cause the spring bearing surface of the block to conform to the contour of the spring 37 when it is in its fully flexed position as shown in Fig. 3.

The block 30 has an opening 45 so that it may be slipped over a hook (not shown) on the car body when the conductor 20 is not in use. The insulation 40 prevents current from passing through the block 30 and into the car body should the generator be placed into operation when the conductor 20 is hooked on the side of the car.

It will be understood that the clamp of this invention may be used for establishing a pressure contact between any two superimposed bodies, the only requirement being that the lower body must be provided with laterally opposed surfaces which the arms of the clamp may grip. Obviously, instead of having a downwardly facing surface, such as the underside of a rail head, the arms of the clamp may be provided with friction means, such as tape or knurling, to enable the clamp to grip substantially vertical opposed surfaces.

We claim:

1. For use with a metallic body having substantially vertical sides adjacent its top and whose sides are recessed at points spaced from the top, the combination of an electric conductor adapted to rest on the metallic body, a block adapted to rest on the conductor but being electrically insulated therefrom, and a mechanical clamp comprising a pair of pivoted jaws each of which is turned inwardly at its free end so as to extend into the recess when the jaws are straddling the body and are lowered so that their ends are in alinement with the recesses, and means cooperating with the block and jaws to shorten the distance between the ends of the jaws when the clamp is forced downwardly towards the metallic body, thereby causing the jaws to grip the metallic body.

2. For use with a metallic body having substantially vertical sides adjacent its top, and whose sides are recessed at points spaced from the top, an electric conductor adapted to rest on the metallic body, and a mechanical clamp comprising a pair of pivoted jaws the free ends of which are turned inwardly to extend into the recesses when the jaws are straddling the body and are lowered so that their ends are in alinement with the recesses, and means cooperating with the conductor and the jaws to force the conductor securely against the metallic body and to shorten the distance between the free ends of the jaws when the clamp is being urged downwardly towards the metallic body, thereby causing the jaws to grip the metallic body.

3. A mechanical clamp for establishing a pressure electrical contact between an electric cable and a rail head, comprising a pair of pivoted jaws the free ends of which are turned inwardly to grip the underside of the rail head, a coil spring extending between the jaws and means reacting between the spring and the cable for stretching the spring in a direction substantially perpendicular to its longitudinal axis and away from the cable so as to shorten the distance between the jaw ends thereby causing the jaws to grip the rail head, and to exert a force on the cable so as to effect a pressure contact with the rail.

4. A mechanical clamp for establishing a pressure electrical contact between an electric conductor and a metallic body having substantially vertical sides adjacent the top thereof, the sides of said body being provided with indentations spaced from the top of the body, comprising a pair of pivoted jaws the free ends of which are turned inwardly so as to extend into the indentations when the jaw arms are straddling the body and the free ends are in alinement with the recesses, and an elastic tension member extending between the arms of the jaw and being secured thereto and means reacting between the elastic member and the electric conductor for shortening the distance between the jaw ends by stretching the elastic member away from said electric conductor, thereby causing the jaws to grip the metallic body and at the same time exerting a force on the conductor, thereby effecting a pressure contact with the metallic body and the conductor.

5. A pair of electric conductors, one of which is superimposed upon the other, and the lower one having laterally opposed surfaces, a clamp having a pair of pivoted jaws, the arms of which are adapted to straddle the superimposed conductors, and elastic tensioning means connecting the arms and adapted to bear against the upper conductor so that when the clamp is forced down over the conductors, the tensioning means will cooperate with said upper conductor to force the arms of the jaw inwardly to engage the opposed surfaces and simultaneously urge the upper conductor into electrical contact with the lower.

6. A mechanical clamp for establishing a pressure electrical contact between superposed conductors comprising a pair of jaws connected for movement apart, and means yieldably urging the jaws together comprising an elastic tension member connected to the jaws at points providing a substantial clearance space above the member and between the jaws into which the member may be elastically deformed, in combination with portions on the jaws below said member for causing the jaws to grip the lower of said conductors, and means projecting from the upper conductor for deforming said member into said space whereby the conductors are pressed together.

7. A mechanical clamp for establishing a pressure electrical contact between superposed conductors comprising a pair of jaws pivoted together at one end to provide a U-shaped assembly and means yieldably urging the jaws together comprising an elastic tension member connected to the jaws at points substantially spaced from their pivot point providing a clearance space above the member and between the jaws into which the member may be elastically deformed, in combination with means on the end portions of the jaws remote from said pivot point for causing the jaws to grip the lower of said conductors, and means projecting from the upper conductor for deforming said member into said space whereby the conductors are pressed together.

WALTER C. BARNES.
HENRY W. KEEVIL.